United States Patent [19]

Devereux

[11] 4,291,331
[45] Sep. 22, 1981

[54] DIGITAL PROCESSING OF N.T.S.C. COLOR TELEVISION SIGNALS

[75] Inventor: Victor G. Devereux, Cheam, England

[73] Assignee: British Broadcasting Corporation, London, England

[21] Appl. No.: 114,041

[22] Filed: Jan. 21, 1980

[30] Foreign Application Priority Data

Jan. 26, 1979 [GB] United Kingdom .............. 02912/79

[51] Int. Cl.³ ........................................... H04N 9/02
[52] U.S. Cl. ................................................ 358/13
[58] Field of Search ........................... 358/12, 13, 140

[56] References Cited

U.S. PATENT DOCUMENTS 3,858,240 12/1974 Golding et al. ...................... 358/13
4,037,248 7/1977 Iijima et al. ........................... 358/13

OTHER PUBLICATIONS

Rossi IEE Conference Publication No. 166 pp. 218-221 (undated).
Rossi SMPTE Journal vol. 85, No. 1, Jan. 1976, pp. 1-6.

*Primary Examiner*—Robert L. Richardson
*Attorney, Agent, or Firm*—Robert F. O'Connell

[57] ABSTRACT

Digital processing of a 525 line N.T.S.C. color television signal is achieved by digitizing (40) with a sub-Nyquist sampling frequency $f_s$ which has a mean value $2 f_{sc} \pm \frac{1}{2} f_F$, or more generally $m f_L \pm (p+\frac{1}{2}) f_F$ (where $f_{sc}$, $f_L$ and $f_F$ are the subcarrier, line scan, and field scan frequencies, and m and p are integers). Conveniently the sampling frequency is exactly $2 f_{sc}$ during each field and suffers a 180° phase shift between fields. After processing, the signal is converted back to analogue form (50) and, to remove alias components, is comb filtered (30) over the frequency range $f_s$–$f_v$ to $f_v$ (where $f_v$ is the maximum video frequency in the original signal) by averaging across a 262 line delay (24'), or more generally a delay of a field minus half a line. Preferably a second comb filter (10) is included before the digitizer (40); the two filters (10, 30) are then so arranged that the overall delay suffered over the whole frequency range is substantially the same. Digital comb filters can be used in which case the filters and converters are reversed in position and the initial sampling is at twice the required frequency $f_s$. Improved diagonal luminance and vertical chrominance resolution is obtained with stationary pictures, and alias components are reduced.

35 Claims, 5 Drawing Figures

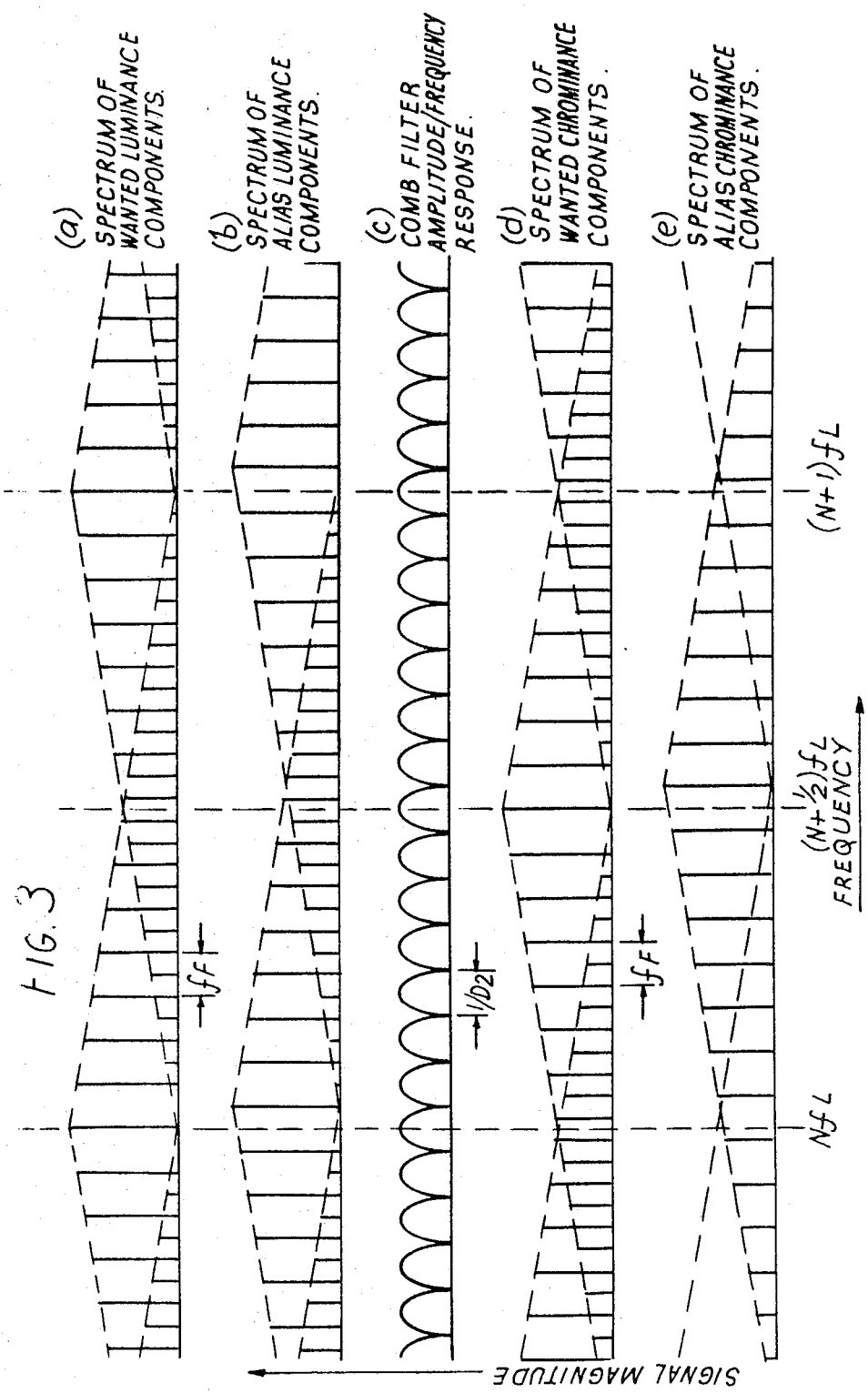

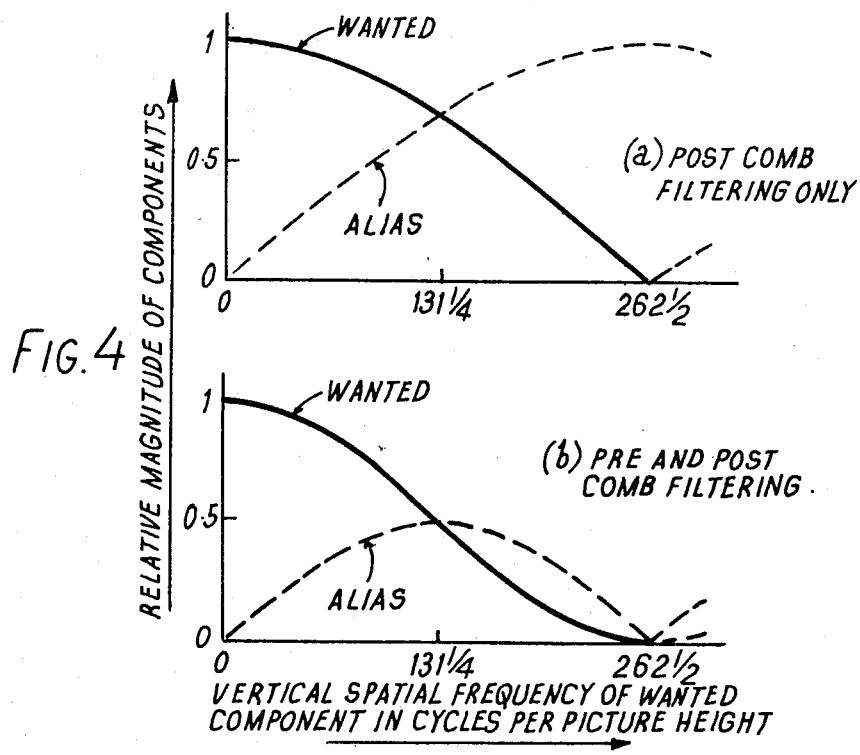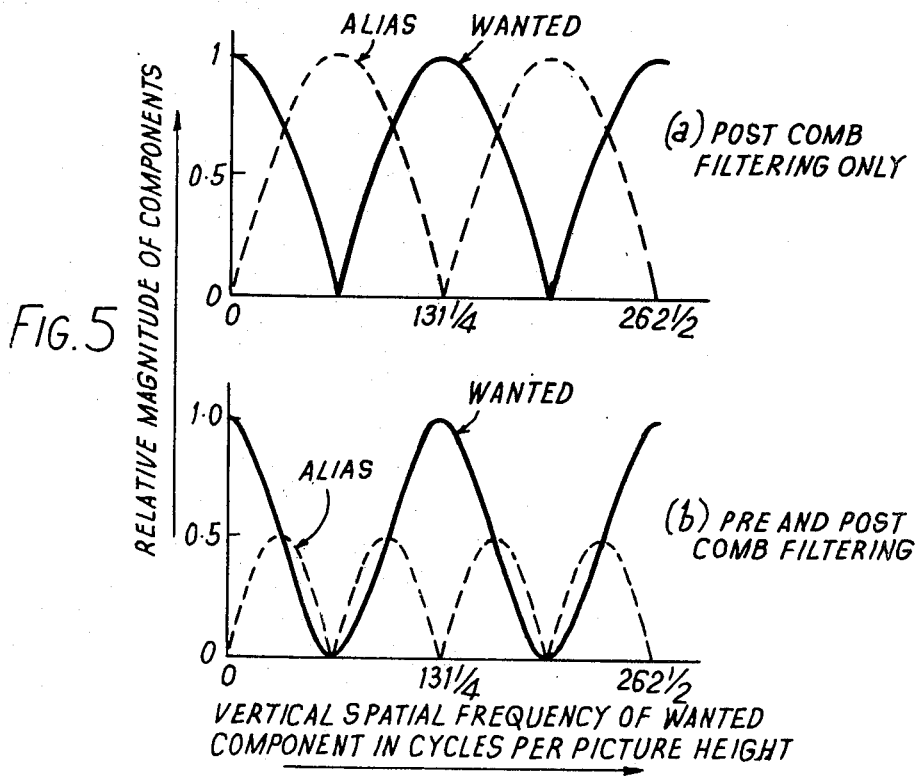

DIGITAL PROCESSING OF N.T.S.C. COLOR TELEVISION SIGNALS

BACKGROUND OF THE INVENTION

This invention relates to the processing of N.T.S.C. colour television signals in digital (e.g. pulse code modulated) form, In particular the invention relates to methods of and apparatus for generating a digital N.T.S.C. colour television signal from an analogue composite N.T.S.C. signal, and regenerating an analogue N.T.S.C. signal from such a digital signal.

It is known that in general where a signal is sampled, a certain minimum sampling frequency is required if all the information conveyed by the signal is to be correctly transmitted. This minimum frequency limit is known as the Nyquist limit, and, for a baseband signal, is equal to twice the highest frequency component in the signal. Any frequency component $f_p$ in the signal will combine with the sampling frequency $f_s$ to generate a component of frequency $f_s - f_p$. As long as the sampling frequency $f_s$ is at least twice the highest signal frequency $f_v$, all the components $f_s - f_p$ will be of frequency higher than $f_v$ and can be removed by low-pass filtering. However, if $f_s$ falls below $2 f_v$, then some of the components $f_s - f_p$ will fall in the signal frequency band. These unwanted frequency components are called 'alias' components.

For transmitting PAL colour television signals, the use of sub-Nyquist sampling frequencies has been described in British patent specification Nos. 1,511,230 and 1,524,749 and 1,580,724. The techniques there described rely on the particular format of the PAL system, and furthermore alias components generated by the PAL chrominance signal must be allowed to pass through a comb filter in the receiver, whereas with N.T.S.C. signals the chrominance alias components should be rejected by this comb filter.

N.T.S.C. signals have proved to be more difficult to digitise with a sub-Nyquist frequency, even in the light of the methods successfully proposed for PAL. For transmitting N.T.S.C. colour television signals, it has been proposed by JOHN P. ROSSI in a paper entitled "Sub-Nyquist-Encoded PCM NTSC Color Television" published in *SMPTE Journal* Vol.85, No.1, January 1976, pages 1 to 6, to take advantage of the fact that the liuminance and chrominance components tend to cluster around specific frequencies related to the line frequency $f_L$. That is, the luminance components tend to cluster around integral multiples of the line frequency, i.e. frequencies given by $kf_L$ where k is an integer, and the chrominance components tend to cluster around odd integral multiples of half the line frequency, i.e. frequencies given by $(k+\frac{1}{2}) f_L$. Rossi proposes the use of a sub-Nyquist sampling frequency of the form $(m\pm\frac{1}{4})f_L$, where m is an integer, together with a comb filter at the receiver. This filter is arranged to remove all frequencies above the highest video frequency $f_v$, to pass all frequencies below $f_s - f_v$, where $f_s$ is the sampling frequency, and to act as a comb filter in the range $f_s - f_v$ to $f_v$. The comb filter response has nulls at frequencies given by $(n\pm\frac{1}{4})f_L$, where n is an integer, thus removing the highest energy alias components, and has minimum attenuation at frequencies given by $nf_L/2$, which are the central frequencies for the clusters of wanted luminance or chrominance components. Such comb filtering can be achieved by combining video signals from alternate (not adjacent) time sequential television lines, i.e. lines separated by two line scan periods.

With Rossi's sub-Nyquist process, wanted high frequency components occurring at frequencies given by $(n\pm\frac{1}{4})f_L$ are removed by the comb filter, but they generate alias components which pass through the comb filter as they occur at frequencies given by $nf_L/2$. A further improvement in the ratio of wanted-to-alias components is obtained by removing wanted components at $(n\pm\frac{1}{4})f_L$ prior to sampling by means of a second comb filter similar to that described above.

As described by Rossi, preferred sampling frequencies for this method of sub-Nyquist sampling are $2 f_{sc} + \frac{1}{4} f_L$ or $2 f_{sc} - \frac{1}{4} f_L$, where $f_{sc}$ is the chrominance subcarrier frequency; both these frequencies are of the form $(m\pm\frac{1}{4})f_L$ since for N.T.S.C. signals, $2f_{sc}$ is an odd integral multiple of $f_L$. Alternatively, the video signal can be sampled at a frequency which remains constant at precisely $2f_{sc}$ during any one line period accompanied by a phase shift of 180° at the start of every alternate time sequential line period. This is described by Rossi in a second paper entitled "Sub-Nyquist Sampled PCM NTSC Color TV Signal Derived from Four Times the Color Subcarrier Sampled Signal" read at the International Broadcasting Convention 1978, and published as *IEE Conference Publication* No.166 at pages 218 to 221. This latter sampling technique, involving a 180° phase shift, has the advantage that the required samples can be extracted at precisely $4f_{sc}$. This sampling frequency has been recommended as a standard.

The main impairments introduced by the N.T.S.C. sub-Nyquist sampling technique described above have proved to be:

(a) reduction of high frequency diagonal luminance resolution,
(b) reduction of vertical chrominance resolution, and
(c) introduction of alias components into the output signal on diagonal high frequency luminance detail or non-vertical chrominance detail.

SUMMARY OF THE INVENTION

This invention proposes an improved sampling system for N.T.S.C. signals which reduces the subjective effects of these impairments.

In accordance with this invention, for an interlaced N.T.S.C. video signal, the filtering employed to reduce alias components produced by sub-Nyquist sampling of these signals combines video signals separated by an integral number of line periods which is equal to one field period minus half a line period. Thus, for a conventional 525 line signal, a delay of 262 lines is suitable. For a 625 line signal, a delay of 312 lines would be appropriate. In addition, the sampling frequency should have a mean value of the form $mf_L \pm (p+\frac{1}{2}) f_F$ where m and p are integers, $f_L$ is the line scan frequency and $f_F$ is the field scan frequency. Preferred sampling frequencies of this type are given by $2 f_{sc} + \frac{1}{2} f_F$ and $2 f_{sc} - \frac{1}{2} f_F$, where $f_{sc}$ is the chrominance subcarrier frequency.

An equivalent effect to sampling at $2 f_{sc} + \frac{1}{2} f_F$ or $2 f_{sc} - \frac{1}{2} f_F$ can be obtained by sampling at a constant frequency of $2 f_{sc}$ during a single field period and then introducing a 180° phase shift of the $2 f_{sc}$ sampling at the start of each field period. Sampling at $2 f_{sc}$ with a 180° phase shift at the start of each field period is equivalent to continuous sampling frequencies of $2 f_{sc} + \frac{1}{2} f_F$ or $2 f_{sc} - \frac{1}{2} f_F$ because all three sampling processes give very similar patterns of sampling points on a displayed raster examined over several successive lines in the raster. An essential feature of this pattern is that the sampling points on any line are horizontally displaced by nearly or exactly one half the distance between successive sampling points with respect to the sampling points on the picture lines immediately above or below, i.e. on the lines scannned one field period minus half a line period earlier or later. In addition, the distance between sampling points is very nearly the same for all three sampling processes.

The main advantages given are that better diagonal luminance resolution and vertical chrominance resolution can be obtained, at least with stationary pictures, and alias components can be reduced.

BRIEF DESCRIPTION OF THE DRAWINGS

The invention will now be described in more detail, by way of example, with reference to the drawings, in which:

FIG. 3 diagrammatically shows the spectra of the wanted and alias components of a stationary picture, and the comb filter response;

FIG. 4 shows at (a) and (b) the vertical filtering given by the system of FIG. 2 if only one or both filters are used, respectively; and FIG. 5 gives similar results for a previous proposal.

DETAILED DESCRIPTION OF THE PREFERRED EMBODIMENT

Figure 1:
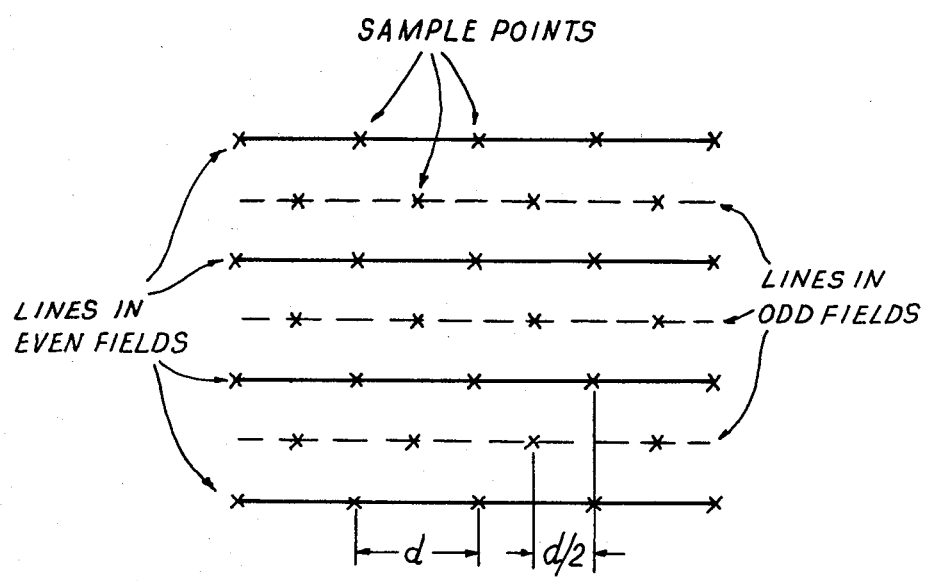
FIG. 1 is a diagram illustrating a portion of a displayed raster and showing the positions of sampling points on odd and even fields with a system embodying this invention.

Referring first to FIG. 1, the raster obtained by the system to be described is illustrated. Television lines of even fields are shown in full lines on the figure and lines of odd fields in broken lines. The sampling points are seen to adopt a regular pattern. The sampling points on any line are horizontally displaced or staggered by substantially one-half the distance between successive sampling points with respect to the sampling points on the picture lines immediately above and below.

The following description applies specifically to sub-Nyquist sampling of 525 lines, 60 fields per sec, interlaced N.T.S.C. colour video signals with a subcarrier frequency $f_{sc}$ equal to 455 $f_L/2$ using a sampling frequency of 2 $f_{sc} \pm \frac{1}{2} f_F$, i.e. 455 $f_L + \frac{1}{2} f_F$ (where $f_L$=line scan frequency; $f_F$=field scan frequency). Similar principles apply when other sub-Nyquist sampling frequencies in accordance with this invention are used.

In the digital transmission system, the analogue input signal is sampled with a sampling frequency as described above and the resultant digital signal applied over a transmission link. At the receiver the signal is converted to analogue form and then applied to a comb filter, of a type described below. It is also much preferred for a second comb filter to be included at the transmitter to filter the input signal. These considerations are described by Rossi in his first paper above-mentioned and are analogous to those for PAL signals discussed in British patent specifications Nos. 1,511,230 and 1,524,749.

Figure 2:
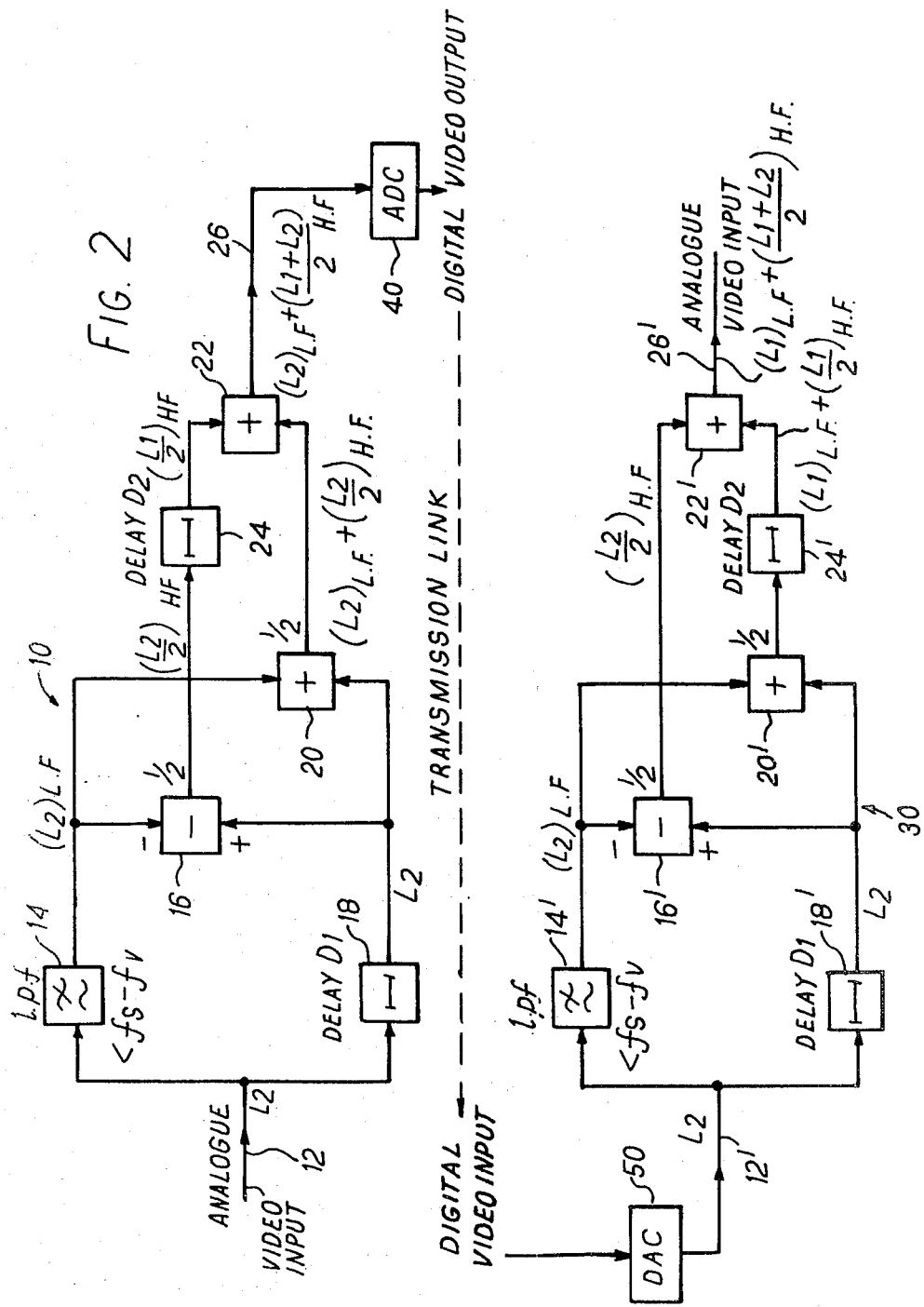
FIG. 2 shows a digital transmission system embodying the invention in block form, and showing in detail the construction of the comb filters.

Referring now to FIG. 2 a digital transmission system embodying the invention is shown. This comprises four main elements; a filter 10 and an analogue-to-digital converter or sampler 40 at the transmitter, and a digital-to-analogue converter 50 and a filter 30 at the receiver.

The filter 10 will first be described. The filter has an input 12 for receiving a composite N.T.S.C. video signal to which is connected a low-pass filter 14 which passes signals of frequency less than $f_s-f_v$. A halving subtractor 16 has its inverting input connected to the output of the low-pass filter 14 and its non-inverting input connected via an equalising delay 18 to the input terminal 12. A halving-adder 20 also has one input connected to the output of the low pass filter 14 and its other input connected to the equalising delay 18. The outputs of the halving subtractor 16 and the halving adder 20 are added in an adder 22 after one of them, namely the output of the halving subtractor 16, has been delayed in a delay 24. The output 26 of the adder 22 constitutes the output of the filter 10.

The filter 30 is almost identical to the filter 10, and corresponding components are given the same references with a prime added. The filter 30 differs from the filter 10 only in that the delay 24' is connected to the output of the adder 20' and not of the subtractor 16'. The filters 10 and 30 can be interchanged.

In the system of FIG. 2 the delay time D2 provided by the delay elements 24 and 24' is equal to 262 line periods, that is one field minus half a line period.

While FIG. 2 shows the transmitter and receiver as connected by a transmission link, this could be replaced by any desired form of processing circuitry, e.g. a recorder. In this specification the terms transmitter and receiver are thus used in a broad sense, and do not necessarily imply that they are separated by a substantial distance.

The analogue-to-digital converter 40 operates with a mean sample rate of 2 $f_{sc} \pm \frac{1}{2} f_F$, this being achieved by sampling at 2 $f_{sc}$ for the duration of a field and then phase displacing the sampling instants by 180° for the next field. Such a sampling rate results in the arrangement of sample positions in the picture shown in FIG. 1.

The symbols $L_1$ and $L_2$ on FIG. 2 indicate video signals on two lines separated in time by delay $D_2$. The suffix L.F. indicates video components with frequencies below the cut off frequency $f_s-f_v$ of the low pass filter 14, where $f_s$ is the sub-Nyquist sampling frequency and $f_v$ is the highest frequency in the input video signal. The suffix H.F. indicates components with frequencies in the range from $f_s-f_v$ to $f_v$.

Both filters 10 and 30 shown in FIG. 2 introduce a group delay of $D_1 + \frac{1}{2} D_2$ for high frequency components, but at low frequencies the delays introduced are different, being equal to $D_1$ and $D_1 + D_2$ for filters 10 and 30 respectively. For this reason these two types of filter are effectively connected in tandem, the overall group delay for low frequency components then being the same as that for high frequency components, being equal to 2 $D_1 + D_2$. Thus the vertical registration of chrominance and h.f. luminance with respect to l.f. luminance is preserved if one of these filters is used before sampling and the other is used after sampling, as shown.

The frequency response of both filters in the frequency range $f_s-f_v$ to $f_v$ has peaks, i.e. minimum attenuation, at frequencies given by integral multiples of $1/D_2$, and nulls midway between these peaks, as illustrated in FIG. 3 at (c). Thus, when $D_2$ is equal to 262 line periods, the peaks and nulls occur at intervals of $f_L/262 = 1/262T_L$ where $T_L$ is equal to one line period and $f_L$ is the line scan frequency. $f_L/262$ is very nearly but not exactly equal to the field frequency $f_F$ of a 525 line interlaced video signal, the precise relationship between $f_L$ and $f_F$ being $f_L = 262\frac{1}{2} f_F$.

FIG. 3 illustrates the effect on the spectrum of a 525 line interlaced N.T.S.C. video signal of a sub-Nyquist sampling process employing a sampling frequency of 455 $f_L + \frac{1}{2} f_F$ and with comb filtering applied after sampling by means of either of the filters 10 and 30 shown in FIG. 2 with $D_2 = 262$ line periods. For clarity, FIG. 3 has been drawn with an incorrect relationship between line and field frequencies.

FIG. 3 shows at (a) the form of the spectrum of the baseband luminance components of an interlaced television signal obtained by scanning a stationary picture. This luminance spectrum has components at frequencies given by $Nf_L + Mf_F$ where N and M are integers. The energy of these components normally decreases as M (and N) increases so the spectral energy is concentrated in bunches centred on line frequency harmonics. Where the bunches centred on adjacent line harmonics overlap, the spectral line in the overlapping bunches interleave as indicated at (a) in FIG. 3.

After sub-Nyquist sampling at 455 $f_L + \frac{1}{2} f_F$, the resulting alias components occur at $(455-N)f_L + (\frac{1}{2} \pm M)f_F$ as illustrated at (b) in FIG. 3. This spectrum is similar to that shown at (a) but offset by $\frac{1}{2} f_F$.

Comparison of the spectra shown in FIG. 3 at (a) and (b) with the comb filter response shown at (c) shows that the highest energy wanted luminance components occur at peaks in the comb structure, and the highest energy alias luminance components occur at the nulls. Thus the comb filter fulfils the requirement of discriminating between wanted and alias luminance components.

The effect of comb filtering on N.T.S.C. chrominance components can be seen by comparison on (c), (d) and (e) of FIG. 3.

FIG. 3 shows at (d) the form of the wanted chrominance components for a stationary picture. This chrominance spectrum has components at frequencies given by $(455/2 \pm P)f_L \pm Qf_F$ for $f_{sc} = 455 f_L/2$, where P and Q are integers. The energy of these components normally decreases as P and Q increase, so that chrominance energy is concentrated in bunches centred on frequencies of the form $(455/2 \pm P)f_L$, i.e. frequencies midway between line frequency harmonics, with maximum energy in the bunch centred at 455 $f_L/2$.

After sampling at 455 $f_L + \frac{1}{2} f_F$, the resulting alias components occur at $(455/2 \pm P)f_L + (\frac{1}{2} \pm Q)f_F$. This spectrum is similar to that of the wanted chrominance components but offset by $\frac{1}{2} f_F$ as illustrated in FIG. 3 at (e).

Comparison of the spectra shown at (d) and (e) with the comb filter response shown at (c) shows that the highest energy wanted chrominance components occur at the peaks in the comb structure and the highest energy alias chrominance components occur at the nulls. Thus the comb filter fulfils the requirement of discriminating between wanted and alias chrominance components.

For moving pictures, additional frequency components are obtained between the spectral lines shown in FIG. 3 and therefore the discrimination between wanted and alias components is, in general, less efficient for moving than for stationary pictures.

Close examination of FIG. 3 shows that as the value of M (used in the expression $Nf_L \pm Mf_F$ for the frequency of wanted luminance components) increases, the attenuation given by the comb filter also increases, until the value of $Mf_F$ is about equal to $f_L$ when the wanted luminance components occur at nulls in the comb structure. This result indicates the effect of the comb filter on vertical luminance resolution because the value of M associated with a given component is equal to the vertical spatial frequency of that component, measured in cycles per picture height. Detailed analysis shows that if a 525-line interlaced television signal is sub-Nyquist sampled and comb filtered as discussed above, the magnitude of wanted and alias luminance components vary with the vertical spatial frequency of the wanted component in the manner shown at (a) in FIG. 4; this figure assumes that only a post-sampling comb filter (30) of either type shown in FIG. 2 is employed, i.e. that filter 10 is omitted. If both pre- and post-sampling comb filters are employed, as shown, the corresponding variation in the magnitude of luminance components is as shown in FIG. 4 at (b).

By similar arguments, it may be shown that (a) and (b) in FIG. 4 also apply to chrominance vertical resolution.

The loss in vertical resolution shown in FIG. 4 only applies to luminance components with high horizontal spatial frequencies, because luminance components with low spatial horizontal frequencies give video frequencies lying below the range $f_s-f_v$ to $f_v$ over which combing is employed. For chrominance components, however, the loss in vertical spatial resolution of a given component is not affected by its horizontal spatial frequency.

The loss in vertical resolution given by the previously proposed technique described above, in which comb filtering is achieved by combining signals from alternate time sequential television lines, is shown in FIG. 5. Comparison in FIGS. 4 and 5 show that the system of FIG. 2 gives a considerable improvement in vertical resolution and in attenuation of alias components for stationary pictures. The improvement, if any, is not as great for moving pictures, however, as the previous technique is virtually unaffected by movement, whereas the present proposal is, in general, worse for moving than stationary pictures. However, the eye is less critical of moving pictures.

It should be noted that in the methods described above it is not necessary for the samples to be taken at a fixed phase position with relation to the colour sub-carrier, indeed it is implicit that they cannot be. This contrasts with the PAL systems of the aforementioned British Patents.

While the use of analogue comb filters has been described, it would be possible to use digital filters based in principle on the filters described in British Pat. No. 1,580,724. In this case, referring to FIG. 2, the ADC 40 would be placed before the comb filter 10 and would sample the signal at twice the sampling rate actually required. Alternate samples would then be delayed and the delayed samples and the other set of alternate samples subtracted. The resultant samples would be bandpass filtered and combined with the delayed samples. Similarly, the comb filter 30 would now be placed before the DAC 50.

What is claimed is:
1. A method of processing an N.T.S.C. colour television signal, comprising:
   at a transmitter, digitising an input signal with a sampling frequency $f_s$ which has a mean value equal to m.$f_L \pm (p+\frac{1}{2})$ $f_F$, where m and p are integers, $f_L$ is the line scan frequency and $f_F$ is the field scan frequency; and at a receiver, comb filtering the received signal at least over the frequency range $(f_s-f_v)$ to $f_v$, where $f_v$ is the frequency of the highest substantial frequency component of the original N.T.S.C. signal; wherein said filtering comprises the steps of: delaying the signal by an integral number of line periods equal to one field period minus half a line period; and providing over the said frequency range a signal equal to the average of the delayed and undelayed signals.

2. A method according to claim 1, wherein the sampling frequency $f_s$ has a mean value equal to 2 $f_{sc} \pm \frac{1}{2}$ $f_F$, where $f_{sc}$ is the colour subcarrier frequency.

3. A method according to claim 2, wherein the sampling frequency has a value of 2 $f_{sc}$ during each field, and suffers a 180 degree phase change once per field.

4. A method according to claim 1, including filtering the input signal at least over the frequency range $(f_s-f_v)$ to $f_v$, where $f_v$ is the frequency of the highest substantial frequency component of the analogue signal, and wherein the filtering comprises the steps of:

delaying the signal by an integral number of line periods equal to one field period minus half a line period; and providing over the said frequency range a signal equal to the average of the delayed and undelayed signals.

5. A method according to claim 4, wherein the filtering takes place after sampling, and the sampling initially is effected with a sampling rate twice that of the required sampling frequency $f_s$.

6. A method according to claim 4, wherein the two filters are so arranged that the overall delay suffered by signals within and outside the said frequency range is substantially the same.

7. A method according to claim 1, wherein the N.T.S.C. signal is a 525 line signal, and the delay period is equal to 262 line periods.

8. A method of generating a digital N.T.S.C. colour television signal from an analogue N.T.S.C. signal, comprising sampling the analogue N.T.S.C. signal at a sampling frequency $f_s$ which has a mean value equal to m $f_L \pm (p+\frac{1}{2})$ $f_F$, where m and p are integers, $f_L$ is the line scan frequency and $f_F$ is the field scan frequency.

9. A method according to claim 8, wherein the sampling frequency $f_s$ has a mean value equal to 2 $f_{sc} \pm \frac{1}{2}$ $f_F$, where $f_{sc}$ is the colour subcarrier frequency.

10. A method according to claim 9, wherein the sampling frequency has a value of 2 $f_{sc}$ during each field, and suffers a 180 degree phase change once per field.

11. A method according to claim 8, including filtering the input signal at least over the frequency range $(f_s-f_v)$ to $f_v$, where $f_v$ is the frequency of the highest substantial frequency component of the analogue signal, and wherein the filtering comprises the steps of:

delaying the signal by an integral number of line periods equal to one field period minus half a line period; and providing over the said frequency range a signal equal to the average of the delayed and undelayed signals.

12. A method according to claim 11, wherein the filtering takes place after sampling, and the sampling initially is effected with a sampling rate twice that of the required sampling frequency $f_s$.

13. A method according to claim 11, wherein the N.T.S.C. signal is a 525 line signal, and the delay period is equal to 262 line periods.

14. A method of regenerating an analogue N.T.S.C. signal from a sampled signal generated by the method of claim 8, comprising:

converting the signal into analogue form; and comb filtering the signal at least over the frequency range $(f_s-f_v)$ to $f_v$, where $f_s$ is the sample frequency and $f_v$ is the frequency of the highest substantial frequency component of the analogue N.T.S.C. signal; wherein the filtering comprises the steps of:

delaying the signal by an integral number of line periods equal to one field period minus half a line period; and providing over the said frequency range a signal equal to the average of the delayed and undelayed signals.

15. A method according to claim 14, wherein the filtering precedes digital-to-analogue conversion.

16. A method according to claim 15, wherein the N.T.S.C. signal is a 525 line signal, and the delay period is equal to 262 line periods.

17. Apparatus for processing an N.T.S.C. colour television signal comprising a transmitting station and a receiving station, wherein the transmitting station comprises:

an analogue signal input; and a digitiser connected to the input for digitising with a sampling frequency $f_s$ which has a mean value equal to m $f_L \pm (p+\frac{1}{2})$ $f_F$, where m and p are integers, $f_L$ is the line scan frequency and $f_F$ is the field scan frequency, and the receiving station includes:

a comb filter for filtering at least over the frequency range $(f_s-f_v)$ to $f_v$, where $f_v$ is the frequency of the highest substantial frequency component of the original N.T.S.C. signal, said filter comprising a delay device for providing a delay of an integral number of line periods equal to one field period minus half a line period, and means for averaging the input and output of the delay device at least over the said frequency range.

18. Apparatus according to claim 17, wherein the sampling frequency $f_s$ has a mean value equal to 2 $f_{sc} \pm \frac{1}{2}$ $f_F$, where $f_{sc}$ is the colour subcarrier frequency.

19. Apparatus according to claim 18, wherein the sampling frequency has a value of 2 $f_{sc}$ during each field, and suffers a 180 degree phase change once per field.

20. Apparatus according to claim 17, including a comb filter for filtering the input signal at least over the frequency range $(f_s-f_v)$ to $f_v$, where $f_v$ is the frequency of the highest substantial frequency component of the original N.T.S.C. signal, and wherein the filter comprises:

a delay device for providing a delay of an integral number of line periods equal to one field period minus half a line period; and means for averaging the input and output of the delay device at least over the said frequency range.

21. Apparatus according to claim 20, wherein the comb filter is connected after the digitiser, and the digitiser initially samples with a sampling rate twice that of the required sampling frequency $f_s$.

22. Apparatus according to claim 20, wherein the two filters are so arranged that the overall delay suffered by signals within and outside the said frequency range is substantially the same.

23. Apparatus according to claim 17, wherein the delay device provides a delay equal to 262 line periods.

24. Apparatus according to claim 17, wherein the comb filter comprises an input terminal, a low-pass filter connected to the input terminal and having a cut-off frequency of $f_s-f_v$, means for providing two signals representing the sum and difference of the signals at the input terminal and the output of the low-pass filter, the delay device being connected to delay one of these two signals, and a combining circuit for combining the output of the delay device with the other of the said two signals.

25. Apparatus for generating a digital N.T.S.C. colour television signal from an analogue N.T.S.C. signal, comprising:
an input for receiving an analogue N.T.S.C. signal and
a digitiser connected to the input for digitising with a sampling frequency $f_s$ which has a mean value equal to m $f_L \pm (p+\frac{1}{2})$ $f_F$, where m and p are integers, $f_L$ is the line scan frequency and $f_F$ is the field scan frequency.

26. Apparatus according to claim 25, wherein the sampling frequency $f_s$ has a mean value equal to 2 $f_{sc} \pm \frac{1}{2}$ $f_F$, where $f_{sc}$ is the colour subcarrier frequency.

27. Apparatus according to claim 26, wherein the sampling frequency has a value of 2 $f_{sc}$ during each field, and suffers a 180 degree phase change once per field.

28. Apparatus according to claim 25, including a comb filter for filtering the input signal at least over the frequency range $(f_s-f_v)$ to $f_v$, where $f_v$ is the frequency of the highest substantial frequency component of the original N.T.S.C. signal, and wherein the filter comprises:
a delay device for providing a delay of an integral number of line periods equal to one field period minus half a line period; and
means for averaging the input and output of the delay device at least over the said frequency range.

29. Apparatus according to claim 28, wherein the comb filter is connected after the digitiser, and the digitiser initially samples with a sampling rate twice that of the required sampling frequency $f_s$.

30. Apparatus according to claim 28, wherein the delay device provides a delay equal to 262 line periods.

31. Apparatus according to claim 28, wherein the comb filter comprises an input terminal, a low-pass filter connected to the input terminal and having a cut-off frequency of $f_s-f_v$, means for providing two signals representing the sum and difference of the signals at the input terminal and the output of the low-pass filter, the delay device being connected to delay one of these two signals, and a combining circuit for combining the output of the delay device with the other of the said two signals.

32. Apparatus for regenerating an analogue N.T.S.C. signal from a sampled signal generated by the method of claim 8, comprising:
a converter for converting the signal into analogue form; and
a comb filter for filtering the signal at least over the frequency range $(f_s-f_v)$ to $f_v$, where $f_s$ is the sample frequency and $f_v$ is the frequency of the highest substantial frequency component of the original N.T.S.C. signal;
wherein the filter comprises:
a delay device for providing a delay of an integral number of line periods equal to one field period minus half a line period; and
means for averaging the input and output of the delay device at least over the said frequency range.

33. Apparatus according to claim 32, wherein the comb filter precedes the converter.

34. Apparatus according to claim 32, wherein the comb filter comprises an input terminal, a low-pass filter connected to the input terminal and having a cut-off frequency of $f_s-f_v$, means for providing two signals representing the sum and difference of the signals at the input terminal and the output of the low-pass filter, the delay device being connected to delay one of these two signals, and a combining circuit for combining the output of the delay device with the other of the said two signals.

35. In an N.T.S.C. colour television processing system, a comb filter for comb filtering a television signal at least over a defined frequency range, wherein said filter comprises:
a delay device for providing a delay of an integral number of line periods equal to one field period minus half a line period; and
means for averaging the input and output of said delay device at least over said frequency range.

* * * * *